Nov. 11, 1958  R. W. MERRIAM  2,860,249
TUNED CIRCUIT AUTOMATICALLY ADJUSTABLE TO RESONANCE BY
CURRENT FLOW THROUGH BI-METALLIC ELEMENTS
Filed March 2, 1955
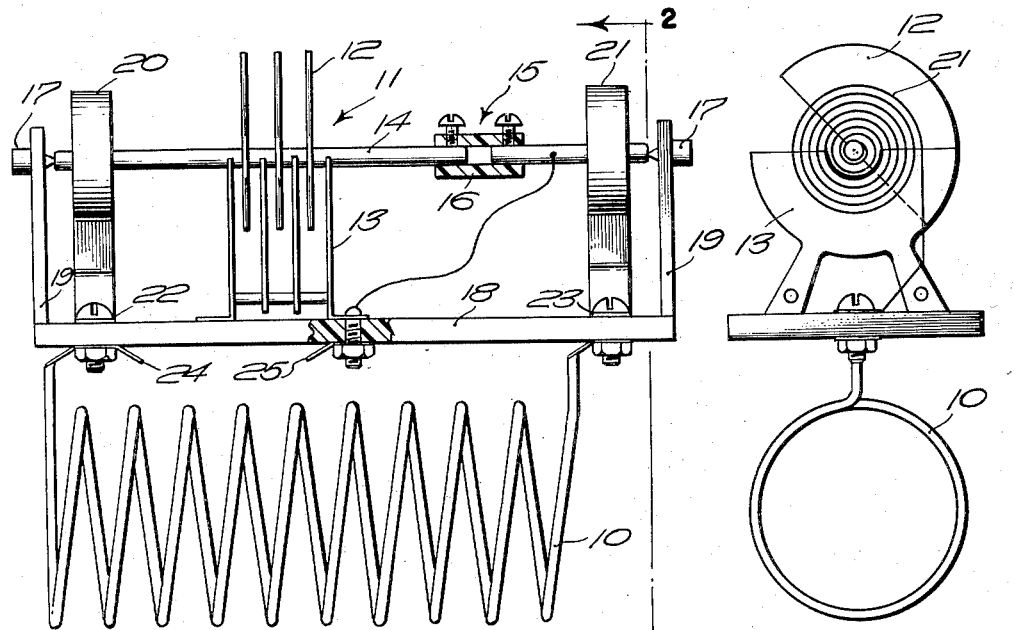
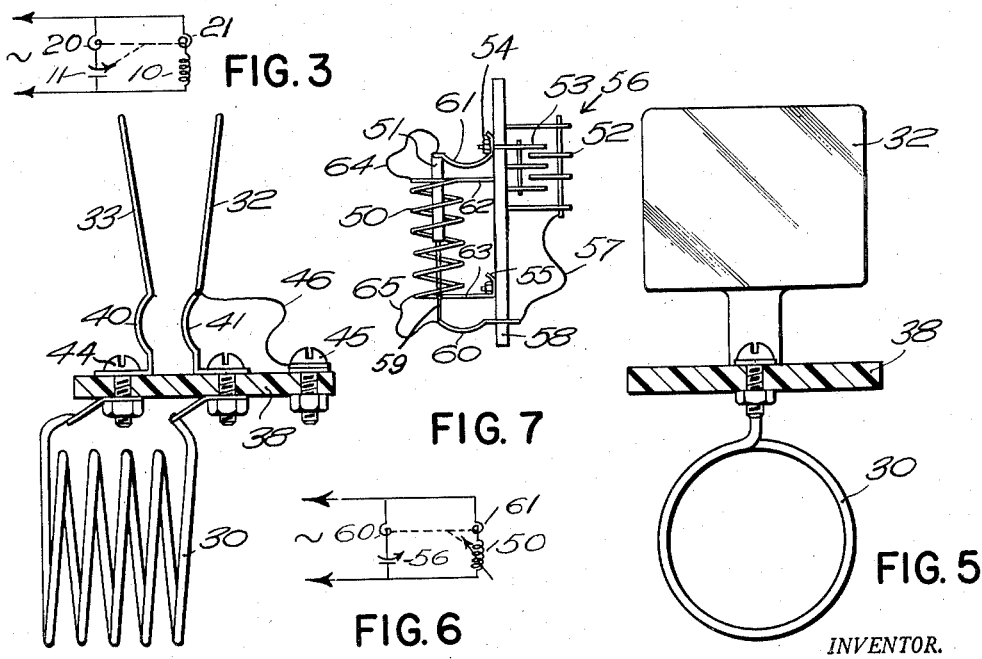
INVENTOR.
ROBERT W. MERRIAM
BY
Barlow & Barlow
ATTORNEYS United States Patent Office 2,860,249
Patented Nov. 11, 1958

2,860,249

TUNED CIRCUIT AUTOMATICALLY ADJUSTABLE TO RESONANCE BY CURRENT FLOW THROUGH BI-METALLIC ELEMENTS

Robert W. Merriam, Seekonk, Mass.

Application March 2, 1955, Serial No. 491,607

7 Claims. (Cl. 250—40)

This invention relates to a tuned circuit and more particularly to a tuned circuit including a device for maintaining the tuned circuit in resonance in response to a varying input frequency.

In the past, various ways have been devised for maintaining a circuit in resonance or alternately varying the resonance frequency of a tuned circuit in response to some preset electrical condition. Also the prior art devices have taken the form of a reactance tube which has been shunted across the tuned circuit in order to vary the reactance of the tuned circuit and thereby vary its resonance frequency. In this type of device and in the other types previously devised, there has always been the necessity for a thermionic vacuum tube to act as the controllable reactance, which has put certain limitations on such prior art systems, particularly in that a source of high voltage as well as filament voltage for the thermionic vacuum tube has been necessary.

It is therefore one of the main objects of the present invention to eliminate thermionic vacuum tubes and provide a system whereby the constants of the tuned circuit will be varied to keep the tuned circuit in resonance for a varying input frequency.

A more specific object of the invention is to insert temperature responsive devices in the inductance and capacitive legs of a tuned circuit, which devices will deform upon heat changes and which will be mechanically coupled to either the capacitor or inductance of the tuned circuit and vary the physical constants thereof.

A still further object of the invention is to provide a device which may be remotely located from the source of radiant frequency energy, such as at the base of an antenna or at the end of a transmission line that will maintain the tuned circuit at the end of such line or at the base of such tower at the resonant frequency of the input source frequency without the need for any auxiliary cables.

With these and other objects in view, the invention consists of certain novel features of construction as will be more fully described and particularly pointed out in the appended claims.

In the drawings:

Figure 1 is an elevational view of a tuned circuit embodying inductance and capacitance in which bimetallic elements have been coupled to the capacitive element of the tuned circuit;

Figure 2 is a side elevational view of the tuned circuit, showing the bimetallic strips;

Figure 3 is an electrical schematic view of the circuit employed in the resonant circuit;

Figure 4 is a modified form of resonant circuit embodying the features of this invention;

Figure 5 is a side elevational view of the showing of Figure 4;

Figure 6 is an electrical schematic view of another form of the invention in which the inductive element is variable; and Figure 7 is an elevational view of one form which the circuit shown in Figure 6 may be physically arranged.

In tuned circuits it is known that at resonance the reactances of the capacitance and inductance will be equal as will the voltage drops across the inductance and capacitance, the latter being 180 degrees out of phase. In a parallel tuned circuit at resonance, the current through the inductance is exactly cancelled by the out of phase current through the capacitance. Therefore, in a parallel tuned circuit the capacitance current equals the inductance current at resonance. At frequencies higher than resonance, the capacitance current exceeds the inductance current, and at frequencies lower than resonance the inductance current is greater. This can be demonstrated by the formula for the frequency of a parallel tuned circuit, which is given by $$f = \frac{1}{2\pi\sqrt{LC}}\left[\frac{R_L^2 C - L}{R_C^2 C - L}\right]^{1/2}$$

Utilizing this effect and inserting into the inductive branch and the capacitive branch bimetallic strips that deform upon a temperature change, which must be arranged so that their torques oppose each other when both bimetallic strips are subjected to the same temperature change, there will result a circuit which will tune itself to the frequency applied across it.

With reference to the drawings, I have shown in Figure 1 a simple parallel tuned circuit designed for use in the medium frequency range consisting of an inductance 10 of the usual helical coiled form and a capacitance 11 consisting of a plurality of interleaving plates 12 and 13, the plates 12 being commonly referred to as the rotor and plates 13 being referred to as the stator. The rotor plates 12 are affixed to a shaft 14 which is split as at 15 by an insulated coupling 16 and supported at each end thereof by antifriction bearings 17. The bearings 17 may be supported from an insulated plate 18 by brackets 19, the insulated plate additionally supporting the stator plates 13 of the capacitance. Mounted at either end of the shaft 14 are a pair of bimetallic strips 20 and 21 which have been illustrated as spirally wound, although it is preferred to coil the strips in a non-inductive manner. One end of each of these strips is anchored to the insulated plate 18, the strip 20 being anchored as at 22 and the strip 21 being anchored as at 23. The other end of each of the bimetallic strips 20 and 21 is anchored to the shaft 14, and they are wound in such a way that as viewing the assembly from one end thereof, one will be wound in a clockwise direction while the other will be wound in a counter-clockwise direction. The strips are also wound to give identical torque, each being affixed to the shaft so that the torques oppose and have small inductance compared to the main circuit parameter 10 if spirally wound as shown. The input terminals to this parallel tuned circuit are represented at 24 and 25, terminal 24 being connected to one end of the inductance 10 and one end of bimettalic strip 20, terminal 25 being connected to one end of bimetallic strip 21. Tracing the circuit of the configuration shown in Figures 1 and 2, it will be seen that the equivalent circuit shown in Figure 3 results, Figure 3 having been simplified by transposing the bimetallic elements to the same side of the inductance capacity as that as would result from the actual connection shown in Figures 1 and 2.

In Figures 4 and 5 I have shown a further modification of a variable capacitor type of parallel tuned circuit, the plates 32, 33 representing the capacitance that is supported on bimetallic curved strips 40, 41. Bimetallic strips 40, 41 support the capacitance plates 32, 33 and in turn are mounted on an insulated plate 38 which in turn supports an inductance 30. Connections to the tuned circuit may be made across terminals 44, 45, the terminal 45 being connected by a flexible lead 46 to the plate 32 of the variable capacitance. The resulting equivalent circuit of this embodiment of Figures 4 and 5 will be that as shown in Figure 3, and it is to be understood that should a greater range of variable capacitance be necessary, the plates 32, 33 may be multiplied in a manner known to those skilled in the art.

In Figures 6 and 7 I have shown a still further modification in which the variable element in this instance is the inductance. The inductance as herein shown may take the form of a usual helically wound coil 50 which has inserted within the interior thereof a slug 51 composed of a conductive material such as copper or brass or powdered iron as the case might be to vary the value thereof. To one end of the slug there is affixed a bimetallic element 61, and to the other end thereof through a suitable insulated extension rod 59 a similar bimetallic element 60 is coupled. The inductance 50 is shown as being self-supporting by leads 62, 63 upon an insulated plate 58, each of these leads being connected to one end of the bimetallic element 60, 61 by means of a flexible lead 64, 65, respectively. The other ends of the bimetallic elements 60, 61 are fixedly secured to the insulated plate 58 and a variable capacitor 56 consisting of rotor plates 52 and stator plates 53 is also supported upon the insulated plate 58. The rotor plates 52 are connected via a flexible lead 57 to the fixed end of bimetallic strip 60 and the stator element 53 of the capacitor is connected to the fixed end of the bimetallic strips 61. Terminals 54, 55 form the connection to this parallel tuned circuit, which results in the equivalent circuit shown in Figure 6.

The operation of the various circuits discussed above are practically identical and depend upon the torque exerted by the bimetallic strips, which strips in each instance have been arranged so that their torques oppose each other when both strips feel the same temperature change. Assuming that the frequency of an exciting source shifts to a higher value, that is, one lower in wave length, the current in the bimetallic strip which is in the capacitive leg and is shown in the drawings as being elements 20, 40, and 60 will exceed the current in the bimetallic strip in the inductance leg, which in the drawings is represented by strips 21, 41, and 61. The $I^2R$ loss in the strip in the capacitance leg will, therefore, be greater than the $I^2R$ loss in the strip in the inductance leg. Therefore, the bimetallic strip in the capacitance leg will be warmer than the bimetallic strip in the inductance leg, and in the embodiments of Figures 1 and 2 the rotor 12 supported on the shaft 14 will suffer an angular rotation due to the torque unbalance. Ideally this rotation will continue until the torques in the two bimetallic strips become balanced again, which condition will be resonance of the parallel tuned circuit, at which point the capacitive and inductive currents will be equal. In actual practice, however, the condition of equal temperature in the strips is generally only met at the unexcited resonant frequency of the circuit. When driven by a frequency other than the resonant frequency of the unexcited circuit, the variable element will move to bring the circuit into resonance but it will fail to reach exact resonance by an amount proportional to the remoteness of the driven frequency from the unexcited resonant frequency. If, in the embodiments of Figures 1 and 2, the unexcited position of the rotor 12 were such that its plates were one half meshed, then the maximum departure from exact tuning would occur when the plates were either fully meshed or fully unmeshed, and the error at each of these positions would be equal and opposite. At intermediate positions, the deviation from exact tuning would be proportionally less. This phenomenon comes about due to the nature of bimetallic strips. As a result of a change in exciting frequency from unexcited resonance a certain differential in current $\Delta i$ will exist in the two strips. This produces a temperature differential $\Delta T$ that will result in a displacement $\Delta A$. In a system of this type where two strips are in effect opposing each other, certain stability must be maintained, and in order for the variable element under control of the strips to maintain a new position, this stability is in the form of the differential torque. Thus $\Delta A$ will not be sufficient to compensate the circuit for the complete change in frequency but is sufficiently close for practical circuit operation.

In the embodiments of Figures 4 and 5 and 6 and 7, the capacitor plates in Figures 4 and 5 and the tuning slug in the embodiment of Figure 7 will be moved by the same effect, the capacitance plates in Figure 4 suffering an angular displacement and the slug 51 of Figure 7 suffering a longitudinal displacement under the angular displacement of the bimetallic elements 60 and 61.

It will thus be seen that I have provided a tuned circuit which will readily respond to resonance upon the application of a varying input frequency. The embodiments as shown in the drawing may, of course, be altered in design from the lumped constants as shown so that the invention as defined in the appended claims is applicable to ultra-high frequency and commonly known microwave techniques.

I claim:

1. In a parallel tuned circuit comprising inductance and capacity for determining the reactance thereof, means for conductively coupling input energy across said tuned circuit, means including two bimetallic elements one element electrically coupled in the inductive branch of said circuit the other element coupled in the capacitive branch of said circuit, said elements mechanically coupled to one of the reactive elements to vary its reactance, one bimetallic element increasing the reactance and the other decreasing the reactance and coupled to said one reactive element in opposing torque relationship to maintain the capacitive and inductive branch currents equal in magnitude.

2. In a parallel tuned circuit as in claim 1 wherein the bimetallic elements are mechanically coupled to the capacitive element to vary its reactance.

3. In a parallel tuned circuit as in claim 1 wherein the bimetallic elements are mechanically coupled to means associated with the inductance to vary the inductive reactance.

4. In a parallel tuned circuit comprising inductance and capacity, means conductively coupling input energy across said tuned circuit, a bimetallic strip in the capacitive and a separate bimetallic strip in the inductive legs, one end of said strips fastened to a fixed support, the other ends thereof being mechanically coupled to a slug within said inductance, in opposing torque relationship which is in parallel with said capacitance, to vary the inductive reactance of said circuit.

5. In a parallel turned circuit comprising inductive and capacitive reactive elements, an inductive leg and a capacitive leg in parallel, means for conductively coupling input energy across said parallel connected legs, a bimetallic strip in series with the capacitive element in the capacitive leg, a separate bimetallic strip in series with the inductive element in the inductive leg, one end of said strips fastened to a fixed support, the other ends thereof being mechanically coupled to one of the reactive elements to vary the magnitude of said reactive element in said circuit in a manner so that the magnitude of the two reactive currents is maintained equal.

6. In a tuned circuit as in claim 5 wherein said capacitive element comprises at least two plates and the reactive element mechanically coupled to said strips is the capacitance, each plate thereof supported by an arched bimetallic strip.

7. In a tuned circuit as in claim 5 wherein said capacitive element is a variable capacitor consisting of interleaved plates and the reactive element mechanically coupled to said strips is the capacitance, one set of plates being mounted on a shaft for rotation relative to the other set, and said bimetallic strips are helically wound in opposite directions, the free ends being attached to said shaft.

References Cited in the file of this patent

UNITED STATES PATENTS

| | | |
|---|---|---|
| 1,616,622 | Horton | Feb. 8, 1927 |
| 1,884,591 | Davis | Oct. 25, 1932 |
| 2,134,794 | Muth | Nov. 1, 1938 |
| 2,151,752 | Ellis | Mar. 28, 1939 |
| 2,185,355 | Peterson | Jan. 2, 1940 |
| 2,439,809 | Hunter | Apr. 20, 1948 |

FOREIGN PATENTS

| | | |
|---|---|---|
| 786,265 | France | Aug. 30, 1935 |